T. S. Washburn,
Burring Machine.
Nº 4,230.      Patented Oct. 11, 1845.
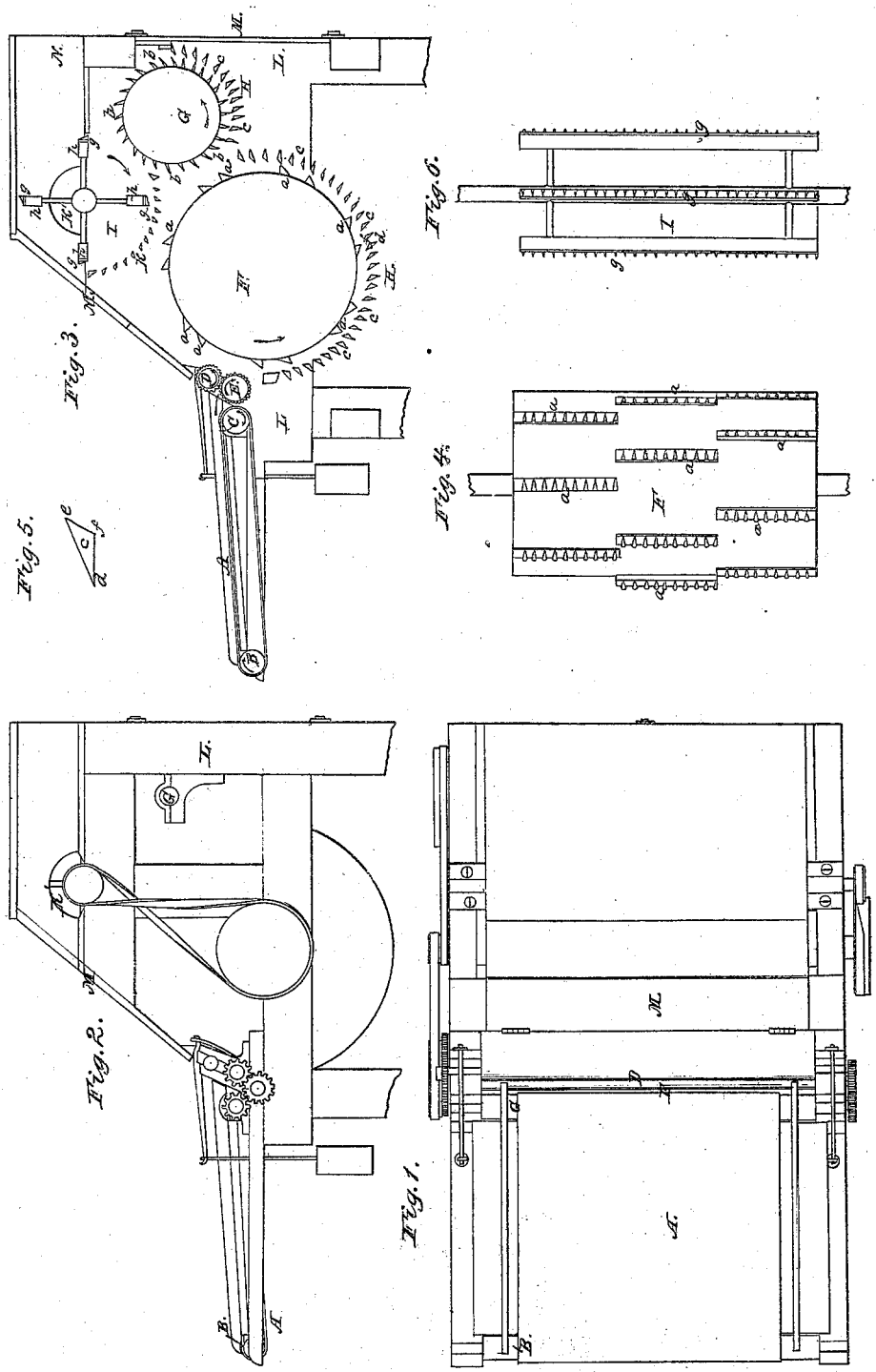

UNITED STATES PATENT OFFICE.

T. S. WASHBURN, OF LOWELL, MASSACHUSETTS.

BURRING-MACHINE.

Specification of Letters Patent No. 4,230, dated October 11, 1845.

*To all whom it may concern:*

Be it known that I, THOMAS S. WASHBURN, of Lowell, in the county of Middlesex and State of Massachusetts, have invented a new and useful improvement in machinery for removing burs or various other extraneous substances from wool or any fibrous matter to which the same is applicable; and I do hereby declare that the nature of my invention and the manner in which the same operates are hereinafter described and represented in the following specification and the accompanying drawings, letters, figures, and references thereof.

Of the said drawings, Figure 1 denotes a plan or top view, Fig. 2, a side elevation and Fig. 3, a vertical, longitudinal and central section of my machine. Such other figures as may be necessary to a full explanation of the mechanism, will be hereinafter referred to and explained.

A, Figs. 1 and 3, denotes an endless apron, which passes around two rollers B, C, and is arranged so as to communicate with two feed rollers D E, placed in front of, and in other respects with regard to it, as seen in the drawings. A large cylinder or drum F, is disposed in advance of the feed rollers. A top view of this drum, exhibiting the manner in which its exterior surface has teeth applied to it, is given in Fig. 4. The said surface has lines of teeth *a*, *a*, &c., fixed upon it, as seen in the said figure, and the form of each of the said teeth is represented in Fig. 3, also, the position of the said teeth, so as to operate upon the fibrous material, is there given. The large cylinder F, has what may be termed a picker cylinder G, arranged in front of it, and operating in connection with it. The whole exterior curved surface of the said picker cylinder, has points or teeth *b*, *b*, inserted in, and projecting from it, and placed at such distance apart from one another, as not to strike against the teeth *a a* of the cylinder F, but to operate so as to perform in connection with them the picking process. A grate H, composed of a series of bars *c*, *c*, &c., of a length equal to that of the cylinders F and G, is disposed entirely underneath the said cylinders, as seen in Fig. 3. The peculiar manner of forming the said bars in their cross section, constitutes one part of my improvement. Fig. 5 denotes an enlarged sectional view of one of the said grate bars, in which it will be perceived that they are formed triangular in section. They are arranged in the machine, with one side *d f* of each, directed toward the center or axis, in a radial plane of one of the cylinders F or G, under which they may be. They thus present to the action of the teeth *a* or *b*, a sharp or acute angular edge *e*, and such a space between each two adjacent teeth, as will readily admit of a free escape between the bars, of any bur or extraneous substance, which may be thrown against them or their edges *e*, by the cylinder F or G. Above the cylinders F and G, and so as to communicate with the latter is placed a revolving fan wheel or blower I, having pointed teeth *g* like those upon the cylinder F, extending from the outer edges of each of its fans *h*, as seen in Figs. 3 and 6, the latter of which denotes a top view of the fan blower, as removed from the machine. A curved grate K, partially surrounds the revolving fan blower I, and is placed and has its teeth arranged with respect to it, as seen in Fig. 3.

The machinery as above described, is supported upon a suitable frame L, and is covered on its top part, and front end, by a casing M, which is left open at N, as seen in Fig. 3. The direction in which each of the cylinders, rollers or revolving parts move, is denoted thereon in Fig. 3 by an arrow. The cylinder F should make about two hundred, the cylinder G about fifty two, and the fan blower I about four hundred and fifty revolutions per minute.

The operation of the machine, (which is calculated particularly for the burring of wool) is as follows. The fibrous material to be divested of its burs, is laid and spread evenly upon the feeding apron, and passes between the feed rollers into the machine. From the feed rollers it is received upon the teeth or lags or lines of teeth of the main cylinder F, which combs it, separates the fibers, and throws them against the grate H, and a great portion of the burs and other foreign matters, through it. As the cylinder F revolves, it lays the wool upon the picker cylinder G. Such burs as are separated by the picking operation, will fall through the grate below the said picker cylinder. From the picker cylinder, the wool or material is taken by the teeth of the fan I, thrown against the grate K, by which the fine burs and dust, or remainder thereof, are discharged, through it, and fall upon the main cylinder. Should any wool adhere to them, it will be wholly or partially removed by the main cylinder and grate beneath it. The wool or fibrous material, being thus treated, is finally blown through the opening N, and out of the machine, by the current of air created by the revolution of the fan I, the said fan receiving air through an opening K', Fig. 2, made through each side of the box, at or near the central part or axis of the fan.

I do not deem it necessary to go into any description of the mechanism, by which the several operative parts of my machine are revolved, as such constitutes no part of my invention. For such purpose, I make use of gear wheels, pulleys and belts, or other well known equivalents, according to circumstances. The chief merit or improvement existing in my invention, is to be found in the use only of the toothed cylinders F, G, the toothed revolving fan I, and the peculiar grates H and K, whereby, in the process of burring wool, I entirely dispense with what are called saw and fine comb cylinders, (such as are employed in the machinery of Francis A. Calvert, and described in the specification of his Letters Patent, of June 3rd 1843, as reissued on December 27th 1843, and which tear and break the fibers of the wool to a very injurious extent), and make use of large and smooth teeth, and angular grate bars only, to effect the purpose. Experience has proved that my improved machine, not only delivers the wool with little or no serious or apparent injury, but it removes the burs in a much more thorough manner, than any machine now in use.

I shall therefore claim—

1. The peculiar manner in which the grate bars are made, so as to operate in connection with the cylinders; viz, triangular in cross section, and so as to present an acute angular or sharp edge, for the teeth of the cylinders to act against, in order to remove the bur or burs as described.

2. I also claim a toothed fan I, and grate K, in combination with the main and picker cylinders F and G and grate H, the whole being arranged and used in connection with a feeding apparatus, substantially as above described.

In testimony whereof, I have hereto set my signature, this second day of July A. D. 1845.

THOS. S. WASHBURN.

Witnesses:
ITHAMAR W. BEARD,
CHAS. G. SARGENT.